United States Patent
Finkelshtain et al.

(10) Patent No.: US 11,028,863 B2
(45) Date of Patent: Jun. 8, 2021

(54) LOW VOLTAGE ELECTRIC-HYDRAULIC DRIVE SYSTEM FOR ELECTRIC TRANSPORTATION

(71) Applicant: GENCELL LTD., Petah Tikva (IL)

(72) Inventors: Gennadi Finkelshtain, Modiin (IL); Tsepin Tsai, Taipei (TW); Ziya Karichev, Moscow (RU)

(73) Assignee: GENCELL LTD., Petah Tikva (IL)

( * ) Notice: Subject to any disclaimer, the term of this patent is extended or adjusted under 35 U.S.C. 154(b) by 0 days.

(21) Appl. No.: 16/776,672

(22) Filed: Jan. 30, 2020

(65) Prior Publication Data

US 2020/0248722 A1 Aug. 6, 2020

Related U.S. Application Data

(60) Provisional application No. 62/799,605, filed on Jan. 31, 2019.

(51) Int. Cl.
 *F15B 11/17* (2006.01)
 *B60K 8/00* (2006.01)

(52) U.S. Cl.
 CPC ............... *F15B 11/17* (2013.01); *B60K 8/00* (2013.01)

(58) Field of Classification Search
 CPC .................................. F15B 11/17; B60K 8/00
 See application file for complete search history.

(56) References Cited

U.S. PATENT DOCUMENTS

| | | | | |
|---|---|---|---|---|
| 6,914,221 | B1* | 7/2005 | Witt | A47J 36/04 219/218 |
| 9,650,130 | B2* | 5/2017 | Bouzmane | B64C 25/405 |
| 10,577,087 | B2* | 3/2020 | Bouzmane | B60L 53/12 |
| 2010/0122864 | A1* | 5/2010 | Rosman | B62D 21/04 180/165 |
| 2015/0266567 | A1* | 9/2015 | Bouzmane | B64C 25/405 244/50 |
| 2017/0217573 | A1* | 8/2017 | Bouzmane | B60L 53/12 |
| 2020/0156771 | A1* | 5/2020 | Bouzmane | B64C 25/405 |

* cited by examiner

*Primary Examiner* — Bryan A Evans
(74) *Attorney, Agent, or Firm* — Abel Schillinger, LLP

(57) ABSTRACT

Disclosed is a hydraulic drive system for a vehicle, which system comprises a hydraulic motor, at least one hydraulic pump, at least one low voltage electric motor, at least one low voltage battery and at least one low voltage fuel cell.

20 Claims, 4 Drawing Sheets

LOW VOLTAGE ELECTRIC-HYDRAULIC DRIVE SYSTEM FOR ELECTRIC TRANSPORTATION

CROSS-REFERENCE TO RELATED APPLICATIONS

The present application claims the benefit under 35 U.S.C. § 119 of U.S. provisional patent application No. 62/799,605, filed Jan. 31, 2019, the entire disclosure of which is expressly incorporated by reference herein.

BACKGROUND OF THE INVENTION

1. Field of the Invention

The present invention relates to a low voltage electric-hydraulic hybrid drive system for electric transportation.

2. Discussion of Background Information

Electric transportation is ready to dominate the future of transportation. However, current solutions have been focusing on lithium batteries as the power source. Lithium batteries can easily be connected in series to form a high voltage system which can power a high voltage motor. However, this high voltage approach can lead to problems regarding safety and fire hazards. Many incidents involving high voltage batteries after a collision or after exposure to water (such as flooding) have already been reported. In addition, a battery-powered electric vehicle requires a charging infrastructure and the generation of large amounts of electricity, requiring relatively long refueling (recharging) times. Additionally, the driving range of a battery-powered vehicle cannot be extended infinitely due to the additional weight of the batteries which are required for extending the driving range. This limits the further expansion of battery-based electric vehicles.

In order to reduce the high voltage risk for electric vehicles many regulations and guidelines regarding the design of the electrical system have been issued. Normally, a high level of insulation and ingression protection (for dust and water) is required. All these requirements have somewhat minimized the risk but also result in high system costs. Further, the risks associated with high voltage are never permanently eliminated because all protective measures wear out over time. Therefore, some dangerous situations are still bound to occur.

Hydrogen-powered fuel cells have been considered a better option than batteries in terms of quick availability of energy, due to a convenient and fast refueling process. However, hydrogen fuel cells have major limitations. In particular, it is preferred for a building block of a fuel cell to be of low voltage (such as, e.g., 24, 36, 48, 60 or 72 V) for it to work effectively with the Balance of Plant (BOP). Also, the response of a fuel cell to a load change is relatively slow. It further is usually preferred to operate the fuel cell under constant power at a state of maximum efficiency. To solve the low-voltage issue, there are currently two major approaches: 1. Providing a fuel cell stack to achieve a higher voltage. This approach increases the BOP complexity. The reliability of this approach is also low, due to the fact that the failure of a single fuel cell will result in the failure of the entire fuel cell stack. 2. Use of a DC/DC converter to step up voltage. This approach is commonly implemented. However, the required step-up ratio (from low voltage to high voltage) is usually high (>4) and the conversion efficiency is normally poor (<90%). The use of DC/DC conversion is also expensive and results in a bulky device which requires sufficient cooling by air or water.

For electric motors and drive systems which are available today for electric vehicles a high voltage (>300 VDC) is normally preferred in order to match the high voltage of the battery. It is difficult to find high-power motors and drive systems based on a low voltage (<100 VDC) which deliver sufficient power for large electric vehicles such as, e.g., an electric bus.

In view of the foregoing, it would be advantageous to be able to overcome the problems of the currently available drive systems for electric vehicles and to provide a drive system which makes it possible to do away with high-voltage batteries and to incorporate therein a hydrogen-powered fuel cell without encountering the disadvantages associated with a low voltage and the slow response to a load change typical for a fuel cell.

SUMMARY OF THE INVENTION

The present invention provides a hydraulic drive system for a vehicle which comprises at least one hydraulic motor, at least one hydraulic pump, at least one low voltage electric motor, at least one low voltage battery, and at least one low voltage fuel cell.

In one aspect of the drive system of the present invention, the at least one hydraulic motor may be connected to at least a first hydraulic pump and a second hydraulic pump. The first hydraulic pump is connected to a first low voltage electric motor and the second hydraulic pump is connected to a second low voltage electric motor. In this case,
(a) both the first low voltage electric motor and the second low voltage electric motor are connected to at least one low voltage battery and at least one low voltage hydrogen fuel cell; or
(b) the first low voltage electric motor is connected to at least two low voltage batteries but is not connected to a low voltage fuel cell (or any other fuel cell) and the second low voltage electric motor is connected to at least two low voltage hydrogen fuel cells but is not connected to a low voltage battery.

In another aspect of the drive system, the at least one hydraulic motor may be connected to at least one hydraulic pump which is connected to a low voltage electric motor, which in turn is connected to at least one low voltage battery and at least one low voltage hydrogen fuel cell.

In yet another aspect of the drive system, the at least one low voltage electric motor and/or the at least one low voltage battery and/or the at least one low voltage hydrogen fuel cell may have a voltage of not higher than 100 V.

In a still other aspect of the drive system, the at least one low voltage hydrogen fuel cell may be an alkaline fuel cell.

In another aspect, the system may be capable of recovering breaking energy for charging the at least one low voltage battery.

The present invention also provides an electric vehicle which comprises a hydraulic drive system according to the invention as set forth above (including the various aspects thereof). For example, the vehicle may be a bus or a truck or a passenger car such as, e.g., a sedan, an SUV or a sports car.

The present invention also provides an electric vehicle which comprises at least two hydraulic drive systems, each of which comprises a hydraulic motor connected to at least one hydraulic pump which in turn is connected to a low voltage electric motor. At least one low voltage electric motor comprised in any of the at least two hydraulic drive systems is connected to at least one low voltage battery and at least one low voltage electric motor comprised in any of the at least two hydraulic drive systems is connected to at least one low voltage fuel cell.

In one aspect, the vehicle of the invention may be an all-wheel drive vehicle. In another aspect, each wheel of the vehicle may be connected to at least one hydraulic drive system according to the invention as set forth above.

In yet another aspect, at least two wheels of the vehicle may be connected to different hydraulic motors.

In a still further aspect of the vehicle, at least all electric components and hydraulic pump(s) of the hydraulic drive system may be protected from exposure to harsh environments. For example, at least all electric components and hydraulic pump(s) of the drive system may be present in a water-proof compartment of the vehicle and/or may be situated in an elevated location of the vehicle.

The present invention also provides a method of enabling an electric vehicle to operate with a low voltage battery. The method comprises incorporating in the vehicle the hydraulic drive system according to the invention as set forth above.

The term "low voltage" as used herein and in the appended claims means a voltage which is not higher than about 200 V, e.g., not higher than about 150 V, not higher than about 120 V, not higher than about 110 V, or not higher than about 100 V. The "low voltage" will usually be at least about 30 V, e.g., at least about 40 V, at least about 50 V or at least about 60 V. It further is to be appreciated that the voltages of the low voltage electric motor(s), the low voltage battery/batteries and the low voltage fuel cell(s) in a drive system may be different from each other and that even the voltages of two different electric motors, the voltages of two different batteries and/or the voltages of two different fuel cells comprised in a hydraulic drive system of the invention may be different, although the latter is not preferred.

In some embodiments the electric drive system of the instant invention will comprise one hydraulic motor which is connected (e.g., via a hydraulic accumulator) to at least two, e.g., at least three, at least four, at least five, or at least six hydraulic pumps. Each of the hydraulic pumps (which may be the same or different from each other) is connected to at least one low voltage electric motor. While it is possible for a hydraulic pump to be connected to more than one low voltage electric motor (e.g., two or three low voltage electric motors, which may be the same or different), it is usually preferred for a hydraulic pump to be connected to only one low voltage electric motor. Each of the low voltage electric motors comprised in the electric drive system is connected to at least one low voltage battery and/or at least one low voltage fuel cell, provided that at least one low voltage electric motor is connected to at least one low voltage battery and at least one low voltage electric motor is connected to at least one low voltage fuel cell. For example, a first low voltage electric motor connected to a first hydraulic pump may be connected (via an electric motor controller) to (only) one or more (e.g., 2, 3 or 4) low voltage batteries and a second low voltage electric motor connected to a second hydraulic pump may be connected (via an electric motor controller) to only one or more (e.g., 2, 3 or 4) low voltage fuel cells. Alternatively, both the first low voltage electric motor and the second low voltage electric motor may independently be connected to one or more (e.g., 2, 3 or 4) low voltage batteries and one or more (e.g., 2, 3 or 4) low voltage fuel cells. In a system which comprises at least three low voltage electric motors it further is possible two have at least one motor which is connected to only one or more low voltage batteries, at least one motor which is connected to only one or more low voltage fuel cells and at least one motor which is connected to both one or more low voltage batteries and one or more low voltage fuel cells. It further is to be appreciated that as in all other embodiments of the drive system of the instant invention, it is possible for a low voltage battery/low voltage fuel cell to be connected to more than one (e.g., two or three) different electric motors, although this is usually not preferred.

If a hydraulic drive system of the instant invention comprises only one hydraulic pump which is connected to a single low voltage electric motor the electric motor is connected to one or more (e.g., 2, 3 or 4) low voltage electric batteries and one or more (e.g. 2, 3 or 4) low voltage fuel cells, for example, to one low voltage battery and one low voltage fuel cell, or one low voltage battery and two, three or four low voltage fuel cells.

In some embodiments of the electric vehicle of the present invention more than one hydraulic drive system (e.g., 2, 3 or 4 drive systems) may be present. These drive systems may be the same or different. For example, each of the wheels of the vehicle may be connected to a separate drive system. Each of the drive systems may independently be configured as set forth above, e.g., with a hydraulic motor connected to a hydraulic pump which is connected to a low voltage electric motor which in turn is connected to at least one low voltage battery and/or to at least one low voltage fuel cell. In other words, each electric motor in this group of hydraulic drive systems may be connected to only one or more low voltage batteries, to only one or more low voltage fuel cells or to one or more low voltage batteries and to one or more low voltage fuel cells. However, in this group of hydraulic drive systems it is not necessary for each single drive system to comprise at least one low voltage battery and at least one low voltage fuel cell. Rather, in this case it suffices for all hydraulic drive systems of the group of drive systems together to comprise at least one low voltage battery and at least one low voltage fuel cell. For example, in the case of a vehicle with four hydraulic motors two of the motors may be (indirectly) powered by only low voltage batteries and two of the motors may be (indirectly) powered by only low voltage fuel cells.

The hydrogen fuel cells for use in the present invention are preferably alkaline fuel cells, although any other hydrogen fuel cells may be used as well such as, e.g., proton membrane exchange fuel cells, phosphoric acid fuel cells and solid acid fuel cells. It also is possible to use a combination of different types of hydrogen fuel cells in the drive system of the invention.

The present invention avoids the disadvantages of the prior art drive systems for electric vehicles and also the disadvantages associated with (high voltage) batteries and (low voltage) fuel cells. In particular, since it is preferred to operate a fuel cell at constant voltage, the fuel cell power is combined with parallel battery power in essentially two approaches, which can be combined. In the first approach an electric level hybrid is provided. In this approach, fuel cell and battery first form an electric power hybrid to power an electric motor/hydraulic pump. The fuel cell provides constant power while the battery provides the peak power with a fast response. In the second approach a hydraulic level hybrid is provided. In this approach a fuel cell and a battery form a hydraulic power hybrid. One type of electric motor/ hydraulic pump is powered by only one or more fuel cells and another type of electric motor/hydraulic pump is powered by only one or more batteries. The hydraulic power is mixed at the hydraulic system to power a hydraulic motor.

The fuel cell system provides the constant power and the battery system provides the peak power with a fast response. The present invention also allows operation at a relatively low voltage, which means that a DC/DC up-conversion can be dispensed with, thereby reducing the cost of the system. Due to the lower voltage the safety of operation and maintenance also increases. The combined use of fuel cell and battery further increases the torque and speed flexibility and results in a higher efficiency of operation and a higher reliability of the system.

Since a hydraulic system is based on a fluid, the transmission of power can easily be accomplished by delivering the power to an individual hydraulic pump/motor. For example, each wheel of an electric vehicle can be connected to its own hydraulic pump/hydraulic motor with the power being transmitted through the hydraulic fluid. This cannot easily or effectively by accomplished with a conventional mechanical transmission. Accordingly, by independent control of (at least) two electric motors optimal efficiency at any given speed can be accomplished, and no mechanical transmission is required.

Further, due to global climate change the risk of flooding and other external contamination of (not only) electric vehicles and thus, of fires and electric leaks increases. With the system of the present invention the electric components (batteries, fuel cells, electric motors) can be placed in a sealed compartment and/or situated in an elevated position of the vehicle, thereby preventing exposure to harsh environmental conditions, while the hydraulic pump can be situated near the propulsion systems which can be exposed to these conditions without being adversely affected thereby. For example, if an electric bus is trapped in a flood and the water level rises to the bus floor the bus can still be operated as long as the electric system and the hydraulic pump are situated in a position above the bus floor or are present in a water-proof compartment of the bus. In view of the foregoing, the present invention makes it possible to use a fuel cell with low voltage and constant power features in large electric transportation applications and to at the same time benefit from advantages such as fast refueling, extended driving range, safety for passengers and maintenance workers and suitability for harsh environmental conditions.

The key components of the hydraulic drive system of the present invention (electric motor, electric motor controller, hydraulic pump and hydraulic motor) are all commercially available. Merely by way of example, a hydraulic pump suitable for use in the system of the present invention is available from the company Settima (Italy), www.settima.it/products/continuum-low-noise-gear-pump.asp, and a hydraulic motor is available from the company Rexroth (Germany), www.boschrexroth.com/en/us/products/product-groups/industrial-hydraulics/motor/high-torque-vane-motors/products/index.

BRIEF DESCRIPTION OF THE DRAWINGS

The present invention is further described in the detailed description which follows, in reference to the accompanying drawings by way of non-limiting examples of exemplary embodiments of the present invention. In the drawings.

DETAILED DESCRIPTION OF EMBODIMENTS OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
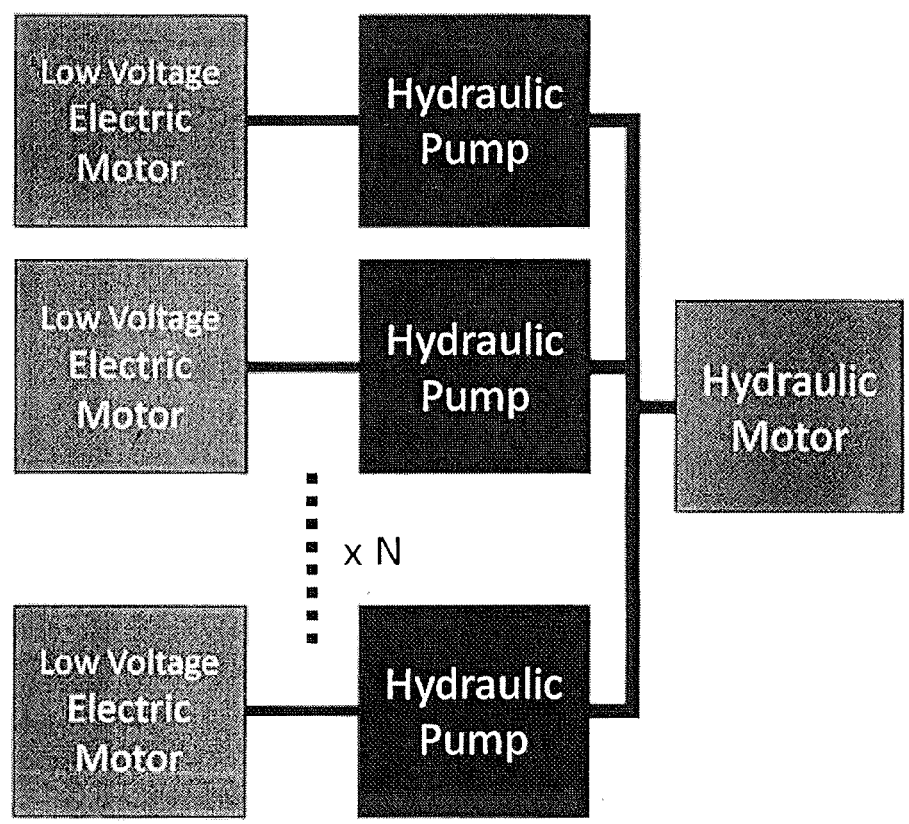
FIG. 1 schematically represents the general design of a hydraulic drive system according to the present invention.

FIG. 1 schematically represents the general design of a hydraulic drive system according to the present invention which comprises one hydraulic motor and more than one hydraulic pump. FIG. 1 shows a hydraulic motor which is connected (through a hydraulic accumulator not shown in FIG. 1) to N hydraulic pumps, three of which are shown in FIG. 1. Of course, according to the present invention it is also possible for the hydraulic motor to be connected to only one or only two hydraulic pumps. Each of the hydraulic pumps is connected to a separate low voltage motor. For example, a low voltage motor with 96 VDC will typically provide a power of 30 kW. If in FIG. 1 N=5, the total power of the hydraulic motor will be 150 kW (assuming there is no transmission loss). In other words, total hydraulic power=electric power×N. There is no electric motor available which delivers 150 kW from a 96 VDC power source.

Figure 2:
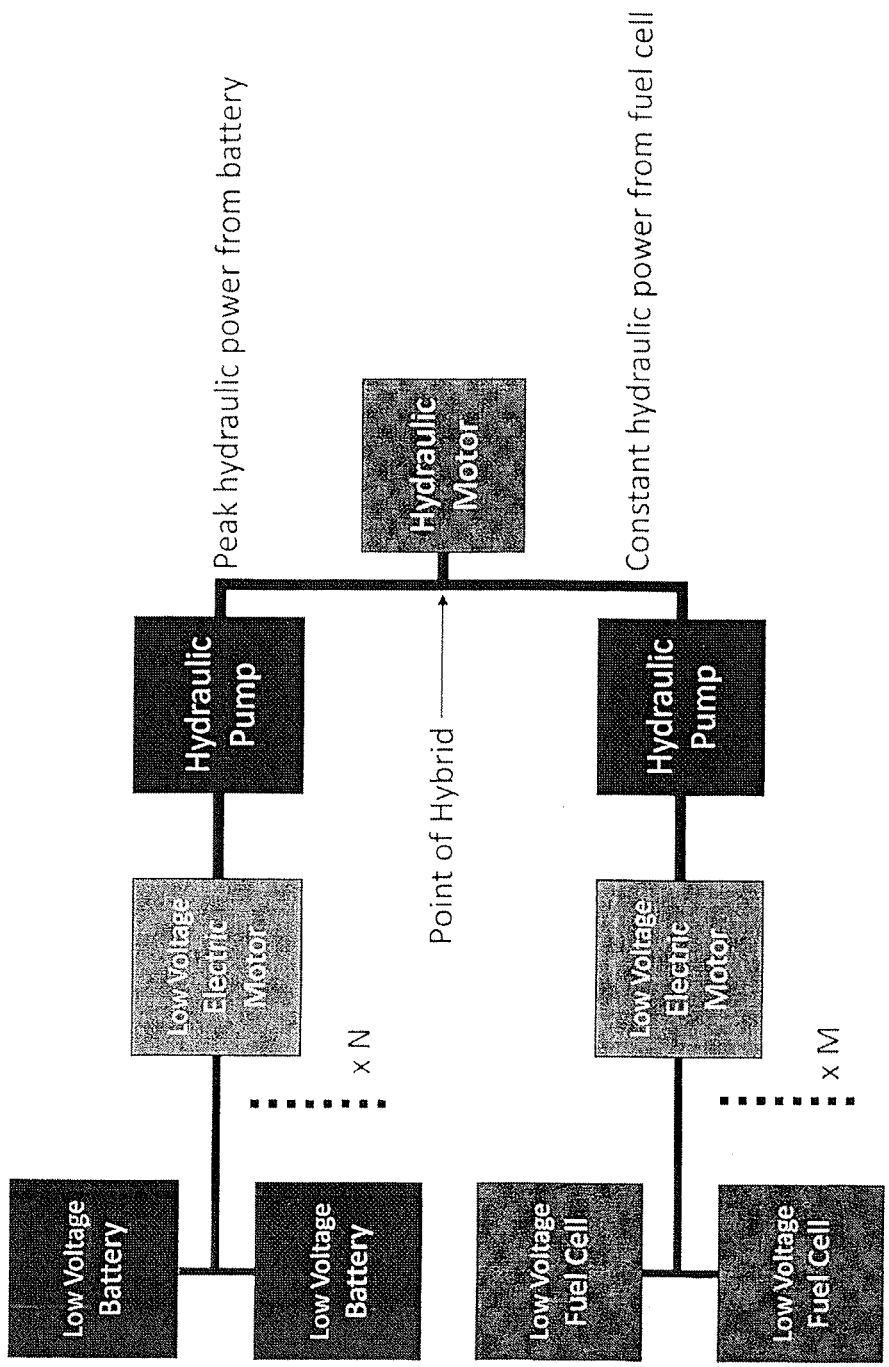
FIG. 2 is a schematic representation of a first embodiment of the hydraulic drive system according to the present invention.

FIG. 2 schematically represents an embodiment of the hydraulic drive system of the invention which is a hybrid at the hydraulic level. Specifically, FIG. 2 shows a hydraulic motor which is connected (through a hydraulic accumulator not shown in FIG. 2) to N hydraulic pumps each of which is connected to a separate low voltage electric motor which in turn is connected (through an electric motor controller not shown in FIG. 2) to two low voltage batteries (only one such hydraulic pump/electric motor is shown in FIG. 2) and to M hydraulic pumps each of which is connected to a separate low voltage electric motor which in turn is connected (through an electric motor controller not shown in FIG. 2) to two low voltage fuel cells (only one such hydraulic pump/electric motor is shown in FIG. 2). Both N and M can independently have values of 1, 2, 3, 4, 5, 6 or even higher. It is, of course, possible for an electric motor to be connected to only one or to more than two (e.g., three or four) low voltage batteries or low voltage fuel cells. Further, if N and/or M are at least 2 it is possible for the electric motors in each of the two groups to be connected to a different number of fuel cells/batteries. Further and as already mentioned, each and every battery/fuel cell may also independently be connected to more than one electric motor.

Figure 3:
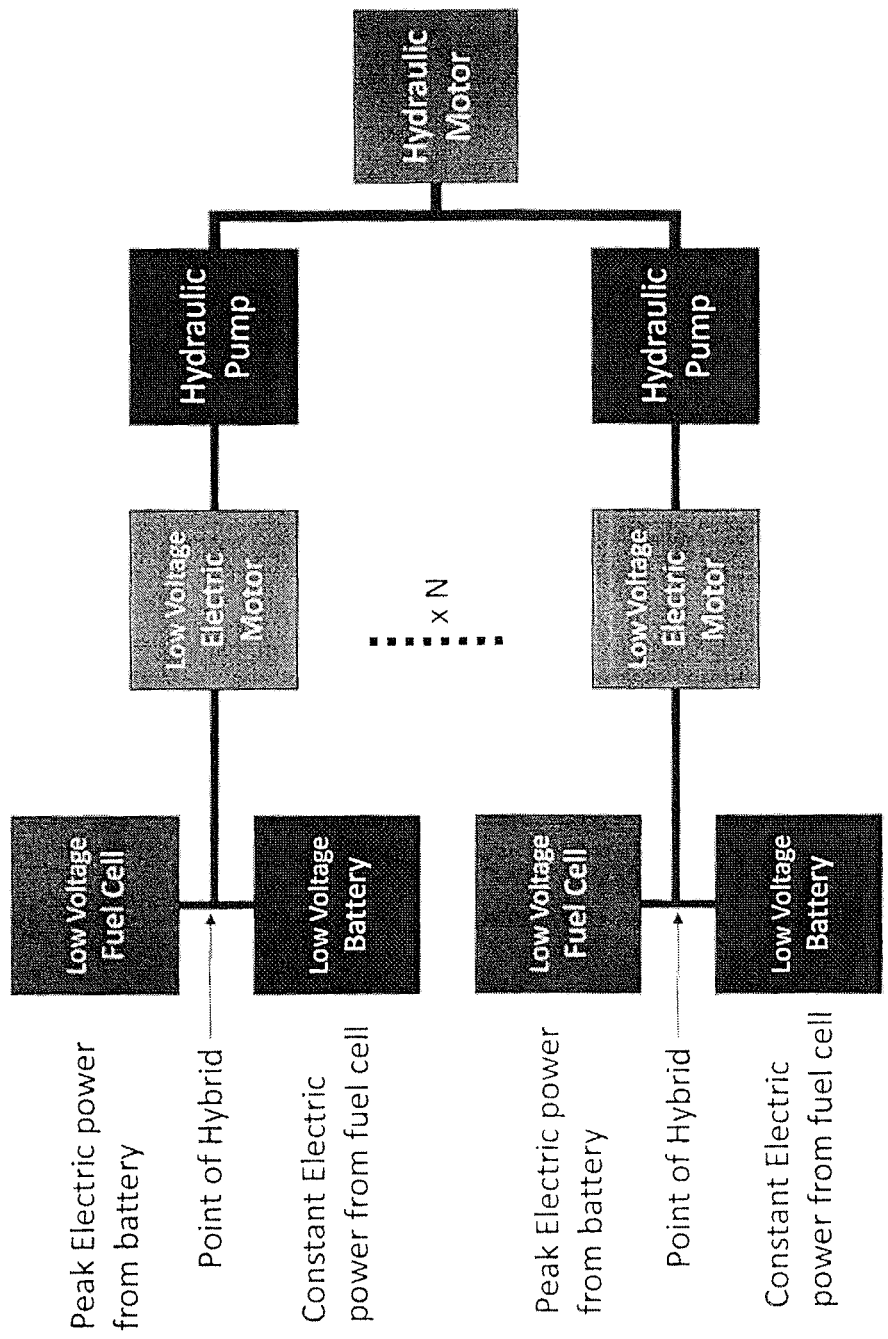
FIG. 3 is a schematic representation of a second embodiment of the hydraulic drive system according to the present invention.

FIG. 3 schematically represents an embodiment of the hydraulic drive system of the invention which is a hybrid at the electric level. Specifically, FIG. 3 shows a hydraulic motor which is connected (through a hydraulic accumulator not shown in FIG. 3) to N hydraulic pumps each of which is connected to a separate low voltage electric motor which in turn is connected (through an electric motor controller not shown in FIG. 3) to one low voltage battery and one low voltage fuel cell (only two such hydraulic pump/electric motor combinations are shown in FIG. 3). N can have values of 1, 2, 3, 4, 5, 6 or even higher. In other words, it is, of course, also possible for a hydraulic motor to be connected to only one hydraulic pump. It further will be appreciated that it is not necessary for an electric motor to be connected to only one battery and only one fuel cell. On the contrary, each of the electric motors in this embodiment can independently be connected to more than one battery (e.g., two or three batteries) and/or to more than one fuel cell (e.g., two or three fuel cells). Additionally and as already mentioned, each and every battery/fuel cell may also independently be connected to more than one electric motor.

While not shown in the instant drawings, the embodiments of the hydraulic drive system of the invention illustrated in FIGS. 2 and 3 may also be combined. In other words, a corresponding system would comprise at least one electric motor which is connected to at least one battery and at least one fuel cell and would also comprise at least one electric motor which is connected to only one or more batteries and/or at least one electric motor which is connected to only one or more fuel cells.

Figure 4:
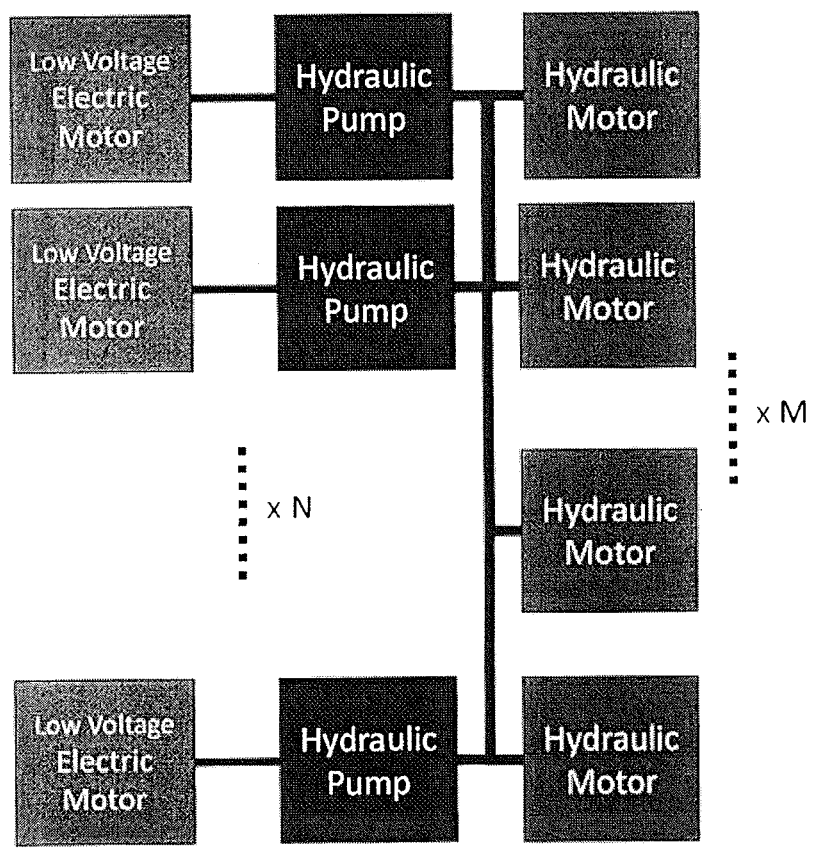
FIG. 4 schematically represents the general design of another hydraulic drive system according to the present invention.

FIG. 4 schematically represents the general design of another hydraulic drive system of the invention. Specifically, FIG. 4 shows a group of M hydraulic motors (four of which are shown in FIG. 4), each of which being connected to a (at least one) hydraulic pump which in turn is connected to a low voltage electric motor. The total number of hydraulic pumps/electric motor combinations is N (three of these N combinations are shown in FIG. 4). M is a number of 2, 3, 4 or even higher, whereas N equals at least M, but can also be higher than M. Preferably, N=M. For example, for N=M=4 each of the four hydraulic motors could be connected to one of the four wheels of an electric vehicle. Assuming, for example, that in this case each hydraulic motor is responsible for one wheel of a hydraulic bus, the electric bus can have a 4-wheel drive and the size of each hydraulic motor can be smaller than that of a hydraulic motor which is connected to all four wheels. Further, in the embodiment shown in FIG. 4 each of the electric motors can be connected to (i) only one or more low voltage batteries or to (ii) only one or more low voltage fuel cells or to (iii) both one or more batteries and one or more fuel cells. It only is required that at least one of the electric motors is connected to at least one low voltage battery and at least one of the electric motors is connected to at least one low voltage fuel cell. For example, in the embodiment with four hydraulic pumps for four wheels it is conceivable that each of the two hydraulic pumps for the front wheels or the rear wheels is connected to hydraulic pumps and electric motors which are connected to both at least one low voltage battery and at least one low voltage fuel cell, whereas the remaining two hydraulic pumps are connected to hydraulic pumps and electric motors which are connected to only one or more low voltage fuel cells or to only one or more low voltage batteries. Alternatively, the first group of hydraulic pumps may indirectly be connected to only one or more low voltage batteries, whereas the second group of hydraulic pumps may be indirectly connected to only one or more low voltage batteries.

What is claimed is:

1. A hydraulic drive system for a vehicle, wherein the system comprises a hydraulic motor, at least two hydraulic pumps, at least two low voltage electric motors, a low voltage battery and a low voltage fuel cell, and wherein the hydraulic motor is connected to at least a first hydraulic pump and a second hydraulic pump, the first hydraulic pump being connected to a first low voltage electric motor and the second hydraulic pump being connected to a second low voltage electric motor, and wherein
   (a) both the first low voltage electric motor and the second low voltage electric motor are connected to at least one low voltage battery and at least one low voltage hydrogen fuel cell; or
   (b) the first low voltage electric motor is connected to at least two low voltage batteries but is not connected to a low voltage fuel cell and the second low voltage electric motor is connected to at least two low voltage hydrogen fuel cells but is not connected to a low voltage battery.

2. The hydraulic drive system of claim 1, wherein the hydraulic motor is connected to at least one hydraulic pump which is connected to a low voltage electric motor which in turn is connected to at least one low voltage battery and at least one low voltage hydrogen fuel cell.

3. The hydraulic drive system of claim 1, wherein both the first low voltage electric motor and the second low voltage electric motor are connected to at least one low voltage battery and at least one low voltage hydrogen fuel cell.

4. The hydraulic drive system of claim 1, wherein the first low voltage electric motor is connected to at least two low voltage batteries but is not connected to a low voltage fuel cell and the second low voltage electric motor is connected to at least two low voltage hydrogen fuel cells but is not connected to a low voltage battery.

5. The hydraulic drive system of claim 1, wherein at least one low voltage hydrogen fuel cell is an alkaline fuel cell.

6. The hydraulic drive system of claim 1, wherein the system is capable of recovering breaking energy for charging the at least one low voltage battery.

7. The hydraulic drive system of claim 1, wherein at least one low voltage electric motor has a voltage of not higher than 100 V.

8. An electric vehicle, wherein the vehicle comprises the hydraulic drive system of claim 1.

9. The vehicle of claim 8, wherein the vehicle is a bus, a truck or an all-wheel drive vehicle.

10. The vehicle of claim 8, wherein each wheel of the vehicle is connected to at least one hydraulic drive system comprising a hydraulic motor, at least one hydraulic pump, at least one low voltage electric motor, at least one low voltage battery and at least one low voltage fuel cell.

11. The vehicle of claim 8, wherein at least two wheels of the vehicle are connected to different hydraulic motors.

12. An electric vehicle, wherein the vehicle comprises at least two hydraulic drive systems each of which comprises a hydraulic motor connected to at least one hydraulic pump which in turn is connected to a low voltage electric motor, and wherein at least one low voltage electric motor comprised in any of the at least two hydraulic drive systems is connected to at least one low voltage battery, and at least one low voltage electric motor comprised in any of the at least two hydraulic drive systems is connected to at least one low voltage fuel cell.

13. An electric vehicle, wherein the vehicle comprises a hydraulic drive system comprising a hydraulic motor, at least one hydraulic pump, at least one low voltage electric motor, at least one low voltage battery and at least one low voltage fuel cell, and wherein at least all electric components and hydraulic pump(s) of the drive system are present in a water-proof compartment of the vehicle and/or are present in an elevated location of the vehicle.

14. The vehicle of claim 13, wherein at least all electric components and hydraulic pump(s) of the drive system are present in a water-proof compartment of the vehicle.

15. The vehicle of claim 13, wherein at least all electric components and hydraulic pump(s) of the drive system are present in an elevated location of the vehicle.

16. The vehicle of claim 13, wherein the vehicle is a bus, a truck or an all-wheel drive vehicle.

17. The vehicle of claim 13, wherein each wheel of the vehicle is connected to at least one hydraulic drive system which comprises a hydraulic motor, at least one hydraulic pump, at least one low voltage electric motor, at least one low voltage battery and at least one low voltage fuel cell.

18. The vehicle of claim 13, wherein at least two wheels of the vehicle are connected to different hydraulic motors.

19. The vehicle of claim 13, wherein at least one low voltage hydrogen fuel cell is an alkaline fuel cell.

20. The vehicle of claim 13, wherein at least one low voltage electric motor has a voltage of not higher than 100 V.

* * * * *